(12) United States Patent
Roman et al.

(10) Patent No.: US 11,465,204 B2
(45) Date of Patent: Oct. 11, 2022

(54) COOLING OF BUILD MATERIAL IN 3D PRINTING SYSTEM

(71) Applicant: HEWLETT-PACKARD DEVELOPMENT COMPANY, L.P., Houston, TX (US)

(72) Inventors: Justin M. Roman, Portland, OR (US); Xavier Alonso Becerro, Sant Cugat del Valles (ES); Ismael Chanclon Fernandez, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 660 days.

(21) Appl. No.: 16/097,017

(22) PCT Filed: Jul. 26, 2016

(86) PCT No.: PCT/US2016/043970
§ 371 (c)(1),
(2) Date: Oct. 26, 2018

(87) PCT Pub. No.: WO2018/022002
PCT Pub. Date: Feb. 1, 2018

(65) Prior Publication Data
US 2019/0126347 A1    May 2, 2019

(51) Int. Cl.
*B22F 3/10*    (2006.01)
*B33Y 40/00*    (2020.01)
(Continued)

(52) U.S. Cl.
CPC .............. *B22F 3/1028* (2013.01); *B22F 3/24* (2013.01); *B29C 64/153* (2017.08);
(Continued)

(58) Field of Classification Search
CPC .......... B22F 3/1028; B22F 3/24; B33Y 30/00; B33Y 40/00; B29C 64/307; B29C 64/321; B29C 64/259; B29C 64/153; B29C 64/255
See application file for complete search history.

(56) References Cited

U.S. PATENT DOCUMENTS 3,563,306 A * 2/1971 Osheroff ................. F15C 1/008
                                                    165/217
4,005,956 A    2/1977 Inoue
(Continued)

FOREIGN PATENT DOCUMENTS

CN        1608832 A        4/2005
CN       103552240         2/2014
(Continued)

OTHER PUBLICATIONS

International Search Report and Written Opinion for International Application No. PCT/US2016/043970 dated Apr. 20, 2017, 7 pages.
(Continued)

*Primary Examiner* — Joseph S Del Sole
*Assistant Examiner* — John Robitaille
(74) *Attorney, Agent, or Firm* — HP Inc. Patent Department

(57) ABSTRACT

A build material management system for a 3D printing system is described in which one or more input ports of a housing of the build material management system is to connect to one or more respective transportable containers. The transportable containers contain a volume of build material comprising 3D printed parts and a portion of non-fused build material. A pump also comprised within the housing is operable to provide a pressure differential across a conduit network of the build material management system. The pump is connected to the input port(s) by the conduit network. An air-flow caused through at least one of the one (Continued)

or more input ports is controlled by processing circuitry also comprised within the housing. The air-flow causes cooling within the respective transportable container. In one alternative, the housing comprises at least two input ports. In all other alternatives, a filling port for filling the or a further transportable container with at least a portion of fresh build material for use in a subsequent 3D printing operation is not comprised within the housing.

8 Claims, 3 Drawing Sheets

(51) Int. Cl.
| | |
|---|---|
| B29C 64/255 | (2017.01) |
| B29C 64/321 | (2017.01) |
| B29C 64/307 | (2017.01) |
| B29C 64/153 | (2017.01) |
| B29C 64/259 | (2017.01) |
| B33Y 30/00 | (2015.01) |
| B22F 3/24 | (2006.01) |

(52) U.S. Cl.
CPC .......... *B29C 64/255* (2017.08); *B29C 64/259* (2017.08); *B29C 64/307* (2017.08); *B29C 64/321* (2017.08); *B33Y 30/00* (2014.12); *B33Y 40/00* (2014.12); *B22F 2003/248* (2013.01)

(56) References Cited

U.S. PATENT DOCUMENTS

| | | | |
|---|---|---|---|
| 5,622,577 A | 4/1997 | O'Connor | |
| 5,876,550 A | 3/1999 | Feygin et al. | |
| 6,579,493 B1 | 6/2003 | Klein et al. | |
| 6,932,935 B1 | 8/2005 | Oberhofer et al. | |
| 7,008,206 B2 | 3/2006 | Fong et al. | |
| 7,979,152 B2 | 7/2011 | Davidson | |
| 8,137,609 B2 * | 3/2012 | McAlea ................ | B33Y 10/00 264/405 |
| 8,185,229 B2 | 5/2012 | Davidson | |
| 8,798,780 B2 | 8/2014 | Menchik et al. | |
| 2002/0090410 A1 | 7/2002 | Tochimoto et al. | |
| 2004/0012112 A1 | 1/2004 | Davidson et al. | |
| 2004/0084814 A1 | 5/2004 | Boyd et al. | |
| 2005/0116391 A1 | 6/2005 | Lindemann et al. | |
| 2005/0280185 A1 | 12/2005 | Russell et al. | |
| 2006/0118532 A1 | 6/2006 | Chung et al. | |
| 2006/0141145 A1 | 6/2006 | Davidson et al. | |
| 2006/0214335 A1 | 9/2006 | Cox | |
| 2006/0219315 A1 | 10/2006 | Cox | |
| 2006/0219671 A1 | 10/2006 | Merot et al. | |
| 2008/0060330 A1 | 3/2008 | Davidson et al. | |
| 2009/0011066 A1 | 1/2009 | Davidson et al. | |
| 2009/0255912 A1 | 10/2009 | Dietrich | |
| 2010/0010852 A1 | 1/2010 | Lang et al. | |
| 2010/0140852 A1 | 6/2010 | Kritchman et al. | |
| 2010/0228381 A1 | 9/2010 | Matsui et al. | |
| 2010/0247742 A1 | 9/2010 | Shi et al. | |
| 2011/0233808 A1 | 9/2011 | Davidson | |
| 2013/0052291 A1 * | 2/2013 | Morikawa ............ | B29C 64/176 425/135 |
| 2014/0035182 A1 | 2/2014 | Boyer et al. | |
| 2014/0271326 A1 | 9/2014 | Cullen et al. | |
| 2015/0190968 A1 | 7/2015 | Griszbacher | |
| 2015/0202687 A1 | 7/2015 | Pialot et al. | |
| 2015/0266211 A1 | 9/2015 | Wolfgang et al. | |
| 2015/0266238 A1 | 9/2015 | Ederer et al. | |
| 2016/0059310 A1 | 3/2016 | Junker et al. | |
| 2016/0068793 A1 | 3/2016 | Maggiore | |
| 2017/0120521 A1 | 5/2017 | Sakura et al. | |
| 2017/0266876 A1 | 9/2017 | Hocker | |
| 2017/0297813 A1 | 10/2017 | Carroll et al. | |
| 2018/0207876 A1 | 7/2018 | Querol et al. | |
| 2018/0333778 A1 | 11/2018 | Sloderbeck et al. | |
| 2019/0009338 A1 | 1/2019 | McMurtry et al. | |
| 2019/0060998 A1 | 2/2019 | Kelkar et al. | |
| 2019/0134909 A1 | 5/2019 | Nicaise et al. | |
| 2019/0143597 A1 | 5/2019 | Huang et al. | |

FOREIGN PATENT DOCUMENTS

| | | |
|---|---|---|
| CN | 203876229 | 10/2014 |
| CN | 104190928 A | 12/2014 |
| CN | 204382677 | 6/2015 |
| CN | 104744022 A | 7/2015 |
| CN | 104959606 | 10/2015 |
| CN | 105397084 A | 3/2016 |
| DE | 102012014838 | 1/2014 |
| DE | 102012106141 A1 | 1/2014 |
| DE | 102012018366 A1 | 3/2014 |
| DE | 102013223411 | 5/2015 |
| DE | 102014010501 A1 | 1/2016 |
| EP | 1429911 | 6/2004 |
| JP | 2008-106319 A | 5/2008 |
| WO | 95/34468 A1 | 12/1995 |
| WO | 2003/035519 A1 | 5/2003 |
| WO | WO 2013063693 | 5/2013 |
| WO | 2014/049159 A1 | 4/2014 |
| WO | 2015/051261 A1 | 4/2015 |
| WO | WO 2015/167335 | 11/2015 |
| WO | WO 2015177195 | 11/2015 |
| WO | 2016/030530 A1 | 3/2016 |

OTHER PUBLICATIONS

International Search Report and Written Opinion for International Application No. PCT/US2016/050363 dated Feb. 16, 2017, 7 pages.
Matisons, M., "Try the "Overkill Cooling" Method for High-Quality Small 3D Printed Parts," retrieved at https://3dprint.com/119203/overkill-cooling-method/, Aug. 4, 2016, 13 pages.
Morris, A., "A New Way to Print 3-D Metals and Alloys," retrieved at https://www.mccormick.northwestern.edu/news/articles/2016/01/a-new-way-to-print-3-d-metals-and-alloys.html, Mar. 31, 2016, 3 pages.

* cited by examiner

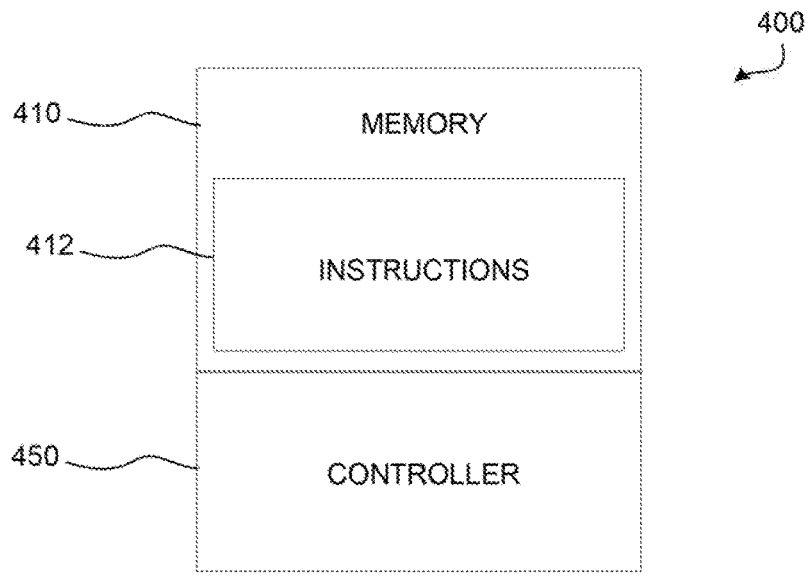
Fig. 6
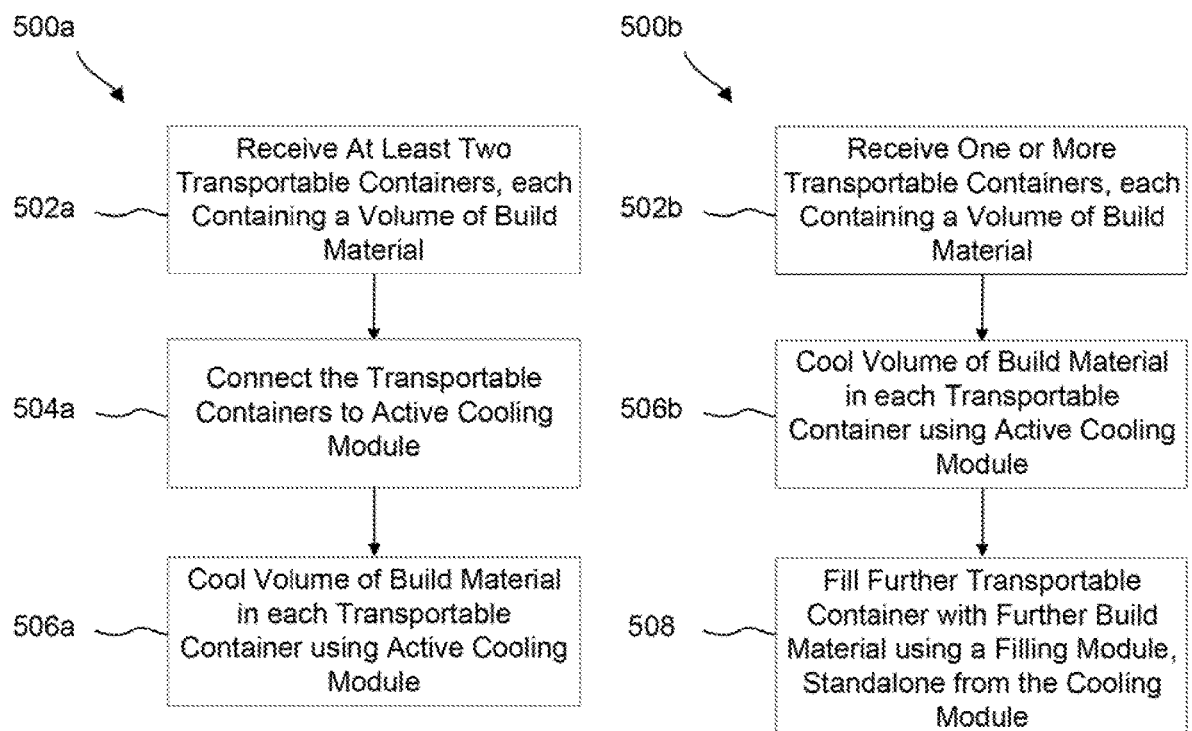
Fig. 7
Fig. 8

COOLING OF BUILD MATERIAL IN 3D PRINTING SYSTEM

BACKGROUND

Additive manufacturing systems that generate three-dimensional objects on a layer-by-layer basis have been proposed as a potentially convenient way to produce three-dimensional objects in small quantities.

The efficiency of additive manufacturing systems varies. Generally, three-dimensional objects generated by additive manufacturing systems may have a cooling-down period after manufacture prior to further processing.

BRIEF DESCRIPTION OF THE DRAWINGS

Examples are further described hereinafter with reference to the accompanying drawings, in which:

FIG. 6 is a simplified illustration of a build material management system according to an example;

FIG. 7 is a flow diagram outlining a method of operating a build material management system according to an example; and FIG. 8 is a flow diagram outlining a method of operating a build material management system according to an example.

DETAILED DESCRIPTION

Figure 1:
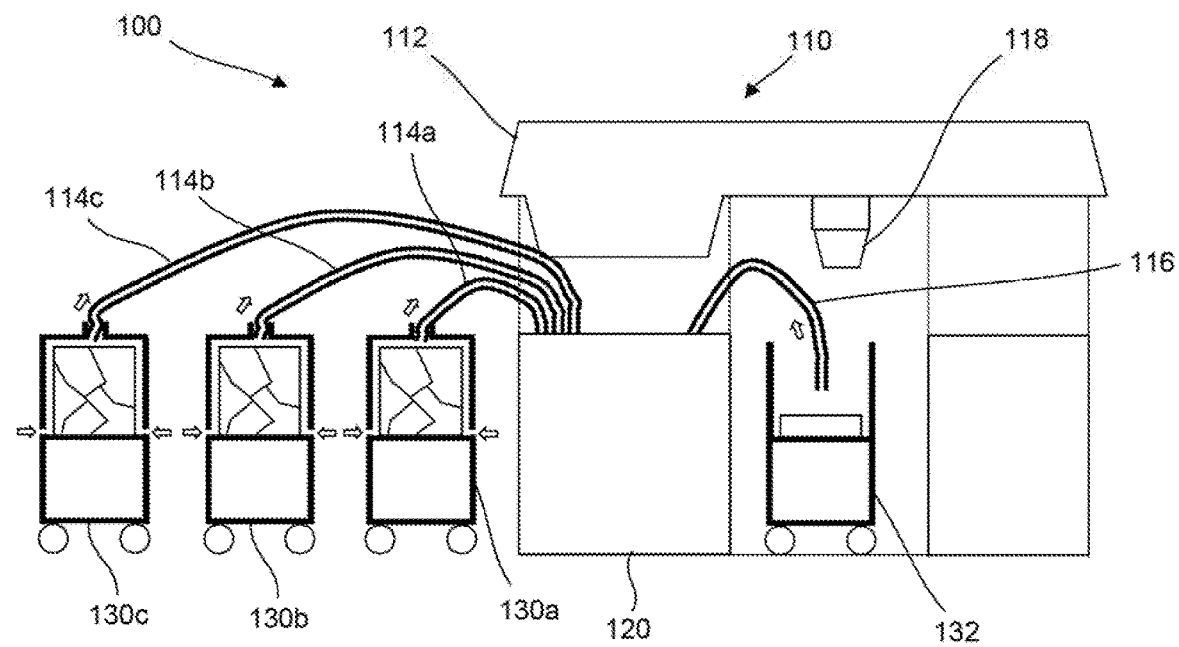
FIG. 1 is a diagram of an example of a build material management system for a 3D printing system.

FIG. 1 shows a diagram of an example of a build material management system 100 for a 3D printing system. The build material management system 100 is for use in a 3D printing system. The 3D printing system may comprise a 3D printer (not shown) to generate three-dimensional objects on a layer-by-layer basis, which may be referred to as an additive manufacturing process. The three-dimensional objects are generated from build material which may be in the form of a powder. The build material is selectively fused together, in layers, to form three-dimensional objects. The fusing process may be as a result of the application of directed heat to the build material or as a result of a chemical process in which the build material is bound using chemical binders, and may result in significant amounts of heat within a volume of the build material. The build material may be or include, for example, powdered metal materials, powdered composite materials, powdered ceramic materials, powdered glass materials, powdered resin materials, powdered polymer materials and the like. In some examples where the build material is a powder-based build material, the term powder-based materials is intended to encompass both dry and wet powder-based materials, particulate materials and granular materials, it should be understood that the examples described herein are not limited to powder-based materials, and may be used, with suitable modification if appropriate, with other suitable build materials. In other examples, the build material may be in the form of pellets, or any other suitable form of build material, for instance.

The build material management system 100 comprises a build material management station 110 to perform build material management operations on build material contained within transportable containers. In the example shown, are three containers in the form of 'hot' mobile build units 130a, 130b, 130c, comprising hot build material and a cooled mobile build unit 132, comprising cooled build material. The build material management station 110 comprises a housing 112 comprising a pumping module 120. The pumping module 120 pumps air and/or build material from the plurality of transportable containers 130a, 130b, 130c, 132 to the material management station 110 and is described in more detail with reference to FIG. 4 below. The pumping module 120 is connected to each of the hot mobile build units 130a, 130b, 130c by respective conduits in the form of three cooling connection hoses 114a, 114b, 114c. Each connection hose 114a, 114b, 114c is connected to the respective hot mobile build unit 130a, 130b, 130c at an upper portion thereof via an input port provided between each cooling connection hose 114a, 114b, 114c and the respective hot mobile build unit 130a, 130b, 130c. Similarly, the pumping module 120 is connected to the cooled mobile build unit 132 by a conduit in the form of a build material extraction hose 116. The build material extraction hose 116 is connected to the cooled mobile build unit 132 via an unpacking port provided between the build material extraction hose 116 and the cooled mobile build unit 132. The structure of the hot mobile build units 130a, 30b, 30c is described in more detail with reference to FIG. 3 below.

The mobile build units 130a, 130b, 130c, 132 contain a build material volume comprising one or more 3D printed parts, surrounded by a portion of non-fused build material, Depending on what type of 3D printing operation has been used to create those 3D printed parts, a temperature of the build material volume immediately after the 3D printing operation and for some time after may be too high for safe and/or effective removal of the one or more 3D printed parts from the build material volume. The build material volume may therefore be allowed to cool prior to an unpacking operation in which the one or more 3D printed parts are separated from the surrounding portion of non-fused build material. In this example, the build material volume within the hot mobile build units 130a, 130b, 130c is actively, cooled by drawing air through the hot mobile build units 130a, 130b, 130c through the cooling connection hose 114a, 114b, 114c using the pumping module 120. By virtue of the temperature of the ambient air in the air flow being lower than that of the hot build material volume, the build material volume is actively cooled by the air-flow. After the active cooling operation, the hot mobile build units 130a, 130b, 130c each become a cooled mobile build unit, such as the cooled mobile build unit 132. It will be appreciated that rather than drawing the air through the hot mobile build units 130a, 130b, 130c to the cooling connection hose 114a, 114b, 114c by a vacuum pump in the pumping module 120, the air may be caused to flow through the cooling connection hose 114a, 114b, 114c to and through the hot mobile build units 130a, 130b, 130c by a positive pump, such as a fan, in the pumping module 120.

The unpacking operation in this example comprises removing the cooled non-fused build material from the cooled mobile build unit 132 via the build material extraction hose 116. A free end of the build material extraction hose 116 is moveable so as to be maneuvered about the build volume for placement where suitable for best separation of the cooled non-fused build material from the 3D printed parts. This unpacking operation may be done by an operator manipulating the free end of the build material extraction hose 116 and, optionally, manipulating the build volume. The unpacking operation may be performed by the pumping module 120 operating as an unpacking module. In other words, the build material extraction hose 116 may be connected to the same pump as the cooling connection hoses 114a, 114b, 114c, under appropriate pressure differential routing control. The build material extraction hose 116 is connected to a build material container to receive the extracted non-fused build material.

After the unpacking operation, the 3D printed parts may be removed from the transportable container. In some examples, the 3D printed parts are removed from the transportable container as part of the unpacking operation. Following the unpacking operation, the transportable container may be referred to as an empty transportable container. The empty transportable containers may then be re-used in a further cooling and unpacking operation, after they have received a further hot build material volume. In some examples, the transportable containers are also used to provide build material to the 3D printer for a subsequent 3D printing operation. In this way, the empty transportable container may be filled with non-fused build material and moved to the 3D printer (not shown) for use in a further 3D printing operation. In other examples, the transportable containers may be filled with a build volume comprising one or more 3D printed parts that has been produced during a 3D printing operation carried out within a different container.

The repeated filling with a build material volume comprising one or more 3D printed parts, cooling the build material volume and unpacking the build material volume may be referred to as an operation cycle on the transportable container. In some examples, the operation cycle may also include refilling with non-fused build material and receiving, layer-by-layer, the build material volume from the 3D printer. It will be understood that each operation in the operation cycle may take a different amount of time. In some examples, the active cooling operation may take longer than other operations in the operation cycle. The material management system 100 can cool build material volumes within a plurality of respective transportable containers to prevent the active cooling operation presenting a bottleneck in the operation cycle when the operation cycle is performed with a plurality of 3D printers. In this example, a single build material management station 110 is connected to a plurality of hot mobile build units 130a, 130b, 130c to perform the active cooling operations on each of the hot mobile build units 130a, 130b, 130c in parallel.

Many factors may influence the cooling time for a build material volume, including, but not limited to: the type of build material, the volume of the build material, the quantity, size and shapes of the one or more 3D printed parts within the volume, the rate of cooling air flow and the hardness of the volume of build material (i.e. the resistance to break-up of the volume of build material). Accordingly, the active cooling operation for each different transportable container may be different. By way of example, the time and or rate at which cooling air is flowing may be independently controlled for each transportable container. This could be based on knowledge of the contents of a transportable container (for example from data stored on a memory on the transportable container or input from a user.) In examples, the specific active coding operation parameters may be determined based on only a single parameter of the volume of build material, such as size (e.g. a height). Although such an approach may not be completely matched to the exact properties of the volume of build material to be cooled, this allows for a relatively small number of options from which a user may select, ensuring the user-interface remains simple to use. In another example, the specific active cooling operation parameters may be adjusted based on feedback from a sensor, such as a thermal sensor (e.g. a thermocouple probe) to be embedded within or adjacent to the volume of build material.

In this example, the housing 112 also comprises a filling port 118 for filling an empty mobile build unit 132 with build material after completion of the unpacking operation. The mobile build unit 132 is filled with build material for a further 3D printing operation in the 3D printer.

It will be understood that an active cooling operation performed using the pumping module 120 may comprise drawing air through one at a time of the plurality of hot mobile build units 130a, 130b, 130c connected to the pumping module 120 via respective cooling connection hoses 114a, 114b, 114c, in a cycling operation. In this way, the pumping module 120 may be controlled to draw air through a first hot mobile build unit 130a and subsequently to draw air through a second hot mobile build unit 130b and further subsequently to draw air through a third hot mobile build unit 130c. The process may then be repeated in order to continue the active cooling operation of all three hot mobile build units 130a, 130b, 130c in parallel without air being drawn through each of the hot mobile build units 130a, 130b, 130c simultaneously. As discussed above, the time and or rate at which cooling air is flowing may be independently controlled for each mobile build unit. In an alternative method of operation, it will be understood that air may be drawn through each of the hot mobile build units 130a, 130b, 130c simultaneously, although optionally at different rates or for different lengths of time.

Figure 2:
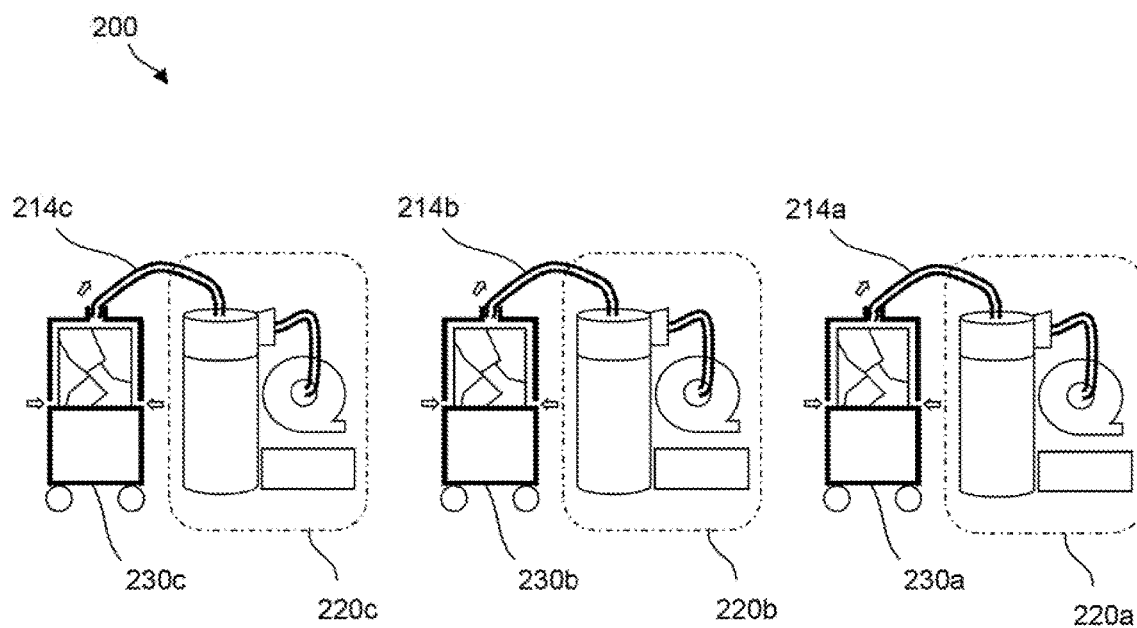
FIG. 2 is a diagram of a further example of a build material management system for a 3D printing system.

FIG. 2 is a diagram of a further example of a build material management system for a 3D printing system. The build material management system 200 shown in FIG. 2 is suitable for cooling a plurality of transportable containers in the form of three hot mobile build units 230a, 230b, 230c. The build material management system 200 comprises a plurality of pumping modules 220a, 220b, 220c provided as separate standalone stations. In this example, each pumping module 220a, 220b, 220c is to be connected to a single hot mobile build units 230a, 230b, 230c by a single respective cooling connection hose 214a, 214b, 214c. Each pumping module 220a, 220b, 220c is provided within a simple respective material management station not including an equivalent of the filling port 118 shown in the material management station 110 of FIG. 1. In this way, the build material management system 200 is capable of cooling build material volumes within a plurality of transportable containers in parallel without requiring a plurality of build material management stations, each having a build material filling capability. Such a build material management system 200 may be particularly cost-effective. In an example, each pumping module 220a, 220b, 220c of the build material management system 200 is provided to cool the volume of build material within the respective hot mobile build units 230a, 230b, 230c. In this way, the pumping modules 220a, 220b, 220c may each be referred to as an active cooling module, and these may each be operated independently to provide optimal cooling air-flow for the respective build material volumes. In another example, as described more fully below with reference to FIG. 4, the pumping modules 220a, 220b, 220c are also provided with an unpack module to unpack the volume of build material within the respective hot mobile build units 230a, 230b, 230c through the same respective cooling connection hose 214a, 214b, 214c.

Figure 3:
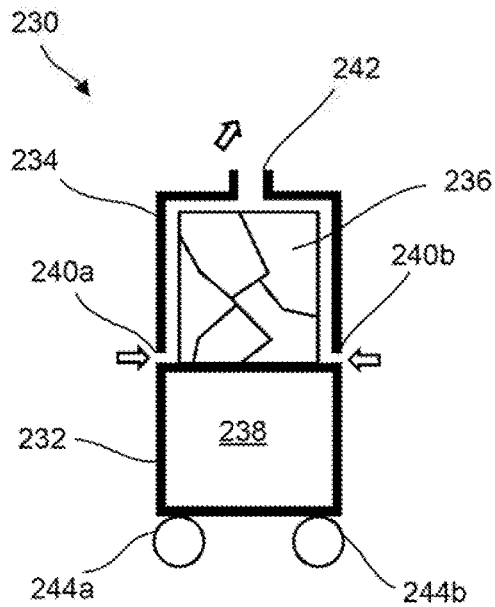
FIG. 3 is a diagram of an example of a transportable container for use in the build material management systems of FIGS. 1 and 2.

FIG. 3 is a diagram of an example of a transportable container in the form of a mobile build unit 230 for use in the build material management systems of FIGS. 1 and 2. The mobile build unit 230 comprises a housing 232 having an upper portion 234 substantially enclosing a volume of build material 236. The housing 232 also comprises a lower portion 238 for containing a supply of build material (not shown) for use in a subsequent 3D printing operation by a 3D printer within a 3D printing system. The build material in the lower portion 238 may be fresh, or a mix of fresh and previously used build material. The upper portion 234 of the housing 232 defines a pair of input ports 240a, 240b to allow air flow into the upper portion 234 of the housing 232 and through the volume build material 236. In this example, the input ports 240a, 240b are located, one each side, at a lowermost end of the upper portion 234 of the housing 232. The upper portion 234 also defines an outlet 242 to allow air to flow out of the upper portion 234 of the housing 232. The outlet 242 is defined within a top section of the upper portion 234. In this example, the outlet 242 is located within a lid portion of the upper portion 234. The outlet 242 may have fixings (not shown) to connect to a cooling connection hose as shown in relation to FIGS. 1 and 2. In this example, the mobile build unit 230 further comprises wheels in the form of caster wheels 244a, 244b to facilitate easy movement of the mobile build unit 230 between different modules of the 3D printing system. The transportable container shown in FIG. 3 is in the farm of a mobile build unit 230 having caster wheels 244a, 244b, but may equally be in the form of a different transportable container for supporting a volume of build material.

Figure 4:
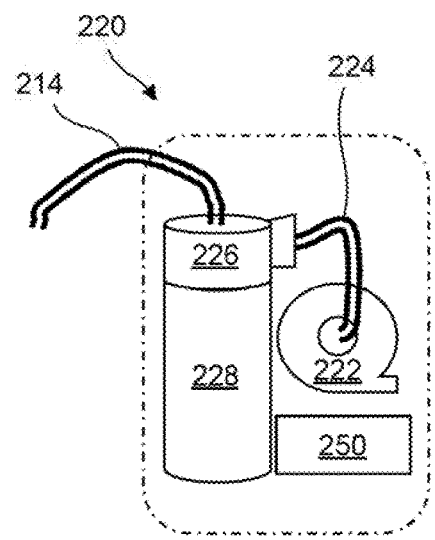
FIG. 4 is a diagram of an example of a pumping module of a build material management system for a 3D printing system.

FIG. 4 is a diagram of an example of a pumping module for a 3D printing system. The pumping module 220 comprises a pump 222 to be connected to a transportable container (not shown) via a cooling connection hose 214 and a pump-to-build material trap conduit 224. The pump 222 is operable to create a pressure differential between the pump 222 and a distal end of the cooling connection hose 214 whereby to draw air into the cooling connection hose 214 from the transportable container. In this example, the pump 222 is a centrifugal pump and causes a pressure below atmospheric pressure upstream of the pump 222 in the cooling connection hose 214. A build material trap 226, such as a cyclonic separator or a filter, is provided between the cooling connection hose 214 and the pump-to-build material trap conduit 224. The build material trap 226 prevents build material within the cooling connection hose 214 and moving towards the pump 222 from entering into the pump-to-build material trap conduit 224. The build material extracted by the build material trap 226 is stored within a storage container 228. In an example, the pumping module 220 is to provide cooling but not an unpacking function to the transportable container connected to the cooling connection hose 214, and so an amount of build material transported within the cooling connection hose 214 towards the pump 222 may be small or non-existent. In this example, the storage container 228 may be small. When the pumping module 220 is to provide cooling but not an unpacking function, the air flow drawn into the cooling connection hose 214 may be sufficiently low as not to transport loose, build material from the transportable container into the cooling connection hose 214. In some examples, it will be understood that the build material trap may be located within the transportable container, and so there may be no build material trap 226 in the pumping module 220 between the connection hose 214 and the pump 222. In an alternative example, the pumping module 220 may also be to extract at least a portion of non-fused build material from the transportable container to the storage container 228. In this alternative example, the storage container 228 may be sized to be large enough to receive the portion of non-fused build material. The pumping module 220 further comprises a controller 250 comprising processing circuitry (not shown) to control the operation of the pumping module 220, and in particular to control the operation of the pump 222.

As with the example described by reference to FIG. 1, the pump may provide a positive pressure differential downstream of the pump to force air to flow from the pump to and through the transportable container, for example via a pump-to-transportable container conduit. In this case, if non-fused build material is to be collected during the cooling operation, then a separate port for outlet of the non-fused build material will be provided, as well as a transportable container-to-build material trap conduit.

Figure 5:
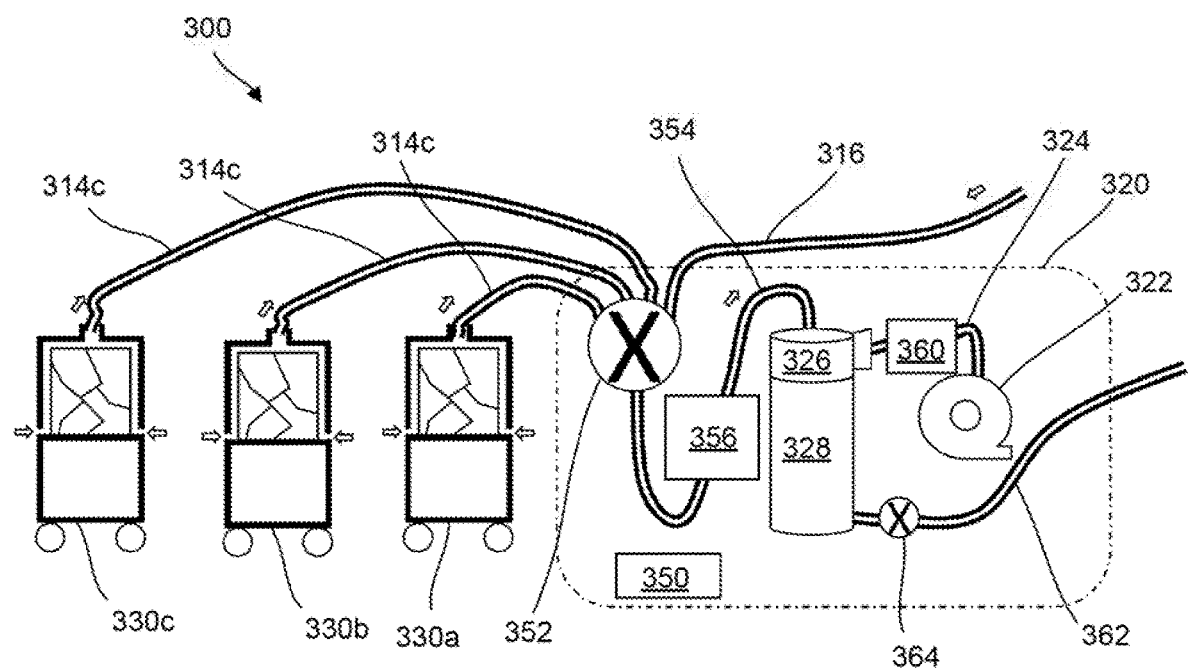
FIG. 5 is a diagram of an example of a build material management system for a 3D printing system.

FIG. 5 is a diagram of an example of a build material management system for a 3D printing system. The build material management system 300 comprises a pumping module 320 substantially as described with reference to the pumping module 220 of FIG. 4 previously apart from the hereinafter described differences, and wherein like parts are designated by like reference numerals but with the preceding '2' substituted by a preceding '3' (for example the controller 250 of FIG. 4 corresponds to the controller 350 of FIG. 5). The pumping module 320 is connected to transportable containers in the form of three mobile build units 330a, 330b, 330c via three respective cooling connection hoses 314a, 314b, 314c. The cooling connection hoses 314a, 314b, 314c are connected to a build material trap 326 via a valve or manifold 352 and a valve-to-build material trap conduit 354. The valve 352 is also connected to a build material input conduit 316 for supplying build material to the pumping module 320 from a separate module of the build material management system 300. The valve 352 is controllable by the controller 350 to facilitate fluid communication between the valve-to-build material trap conduit 354 and one or more of the cooling connection hoses 314a, 314b, 314c and the build material input conduit 316. Hence, the hot mobile build units 330a, 330b, 330c may be cooled in an operation analogous to that described with respect to the hot mobile build units of FIG. 1. In this example, a material conditioning unit 356 is connected in the path of the valve-to-build material trap conduit 354 to process or filter the build material flowing within the valve-to-build material trap conduit 354 prior to the build material reaching the build material trap 326 and entering the storage container 328. A storage container-to-further module conduit 362 is provided between the storage container 328 and a further module (not shown) of the build material management system 300. An air filter 360 is provided in the pump-to-build material trap conduit 324. A valve 364 is operable to open or close the storage container-to-further module conduit 362. In this way, build material within the storage container 328 can be transported to a further module within the build material management system 300 if desired. It will be understood that a further pump (not shown), provided in the further (and separate) module of the build material management system 300 may be needed to transport build material from the storage container 328 to the further module of the build material management system 300. In an example, it will be understood that the pumping module 320 may be used as the pumping module 120 of FIG. 1, with the build material input conduit 316 being the build material extraction hose 116 and the storage container-to-further module conduit 362 being connected to the filling port 118. Therefore, in some examples, the pumping module 320 may operate within a single module of the build material management system. As with the above-described examples, the active cooling operations for each mobile build unit 330a, 330b, 330c may be independently controlled to provide optimal cooling air-flow for the respective build material volumes.

FIG. 6 is a simplified illustration of a build material management system 400 according to an example of the present disclosure. The system 400 comprises a controller 450 that controls the general operation of the build material management system 400. In the example shown in FIG. 6 the controller 450 is a microprocessor-based controller that is coupled to a memory 410, for example via a communications bus (not shown). The memory stores processor executable instructions 412. The controller 450 may execute the instructions 412 and hence control operation of the build material management system 400 in accordance with those instructions.

In one example, the controller 450 controls the pumping module 220 to implement the cooling operation described hereinbefore.

FIG. 7 is a flow diagram outlining a method of operating a build material management system according to an example of the present disclosure. In the method 500a of FIG. 7, at 502a, at least two transportable containers in the form of mobile build units are received by the build material management system. Each transportable container comprises a volume of build material. At 504a, the transportable containers are connected to an active cooling module of the build material management system. At 506a, the active cooling module is controlled to cool the volume of build material within each transportable container.

FIG. 8 is a flow diagram outlining a method of operating a build material management system according to an example of the present disclosure. In the method 500b of FIG. 8, at 502b, one or more transportable containers are received by the build material management system. The or each transportable container comprises a volume of build material. At 506b, an active cooling module of the build material management system is controlled to cool the volume of build material within the or each transportable container. At 508, the build material management system is controlled to fill a further transportable container with further build material using a filling module, separate from the active cooling module of the build material management system. It will be understood that the further transportable container may be the same as one of the one or more transportable containers in some examples.

It will be understood that although the specific description has used the example of the transportable containers taking the form of mobile build units such as trolleys, other types of transportable container are envisaged, including those without wheels and those without a portion for containing a supply of fresh build material. In some circumstances, it may be desirable to transfer the contents of a transportable container that has been used in a 3D printing operation to another transportable container, for example to decouple the build process from the cooling and unpacking processes.

It will be appreciated that examples described herein can be realised in the form of hardware, or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, examples provide a program comprising code for implementing a system or method as described herein and a machine readable storage storing such a program.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular example of the disclosure are to be understood to be applicable to any other example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing examples. The disclosure extends to any novel one, or any novel combination, of the features disclosed in this specification (including any accompanying claims, abstract and drawings), or to any novel one, or any novel combination, of the steps of any method or process so disclosed.

The invention claimed is:

1. A build material management system for a 3D printing system to simultaneously cool multiple transportable containers each containing 3D printed parts packed in a volume of non-fused build material, an air input port, and an air outlet, the build material management system comprising:
   a pump;
   multiple conduits in fluid communication with the pump through a valve, each conduit having an air inlet that connects to the air outlet from a respective one of the transportable containers; and
   a controller operatively connected to the pump and the valve, the controller programmed to, with the inlet of each conduit connected to the air outlet of a respective one of the multiple transportable containers, cause the pump and the valve to pump air simultaneously through all of the conduits to draw air through each of the transportable containers from the air input port to the air outlet without unpacking the printed parts from the volume of non-fused build material.

2. A build material management system as claimed in claim 1, wherein the controller is programmed to, with the inlet of each conduit connected to the air outlet of a respective one of the multiple transportable containers, cause the pump and the valve to pump air through only a first one of the conduits and then through only a second one of the conduits different from the first one.

3. A build material management system as claimed in claim 2, wherein the controller programmed to cause the pump and the valve to pump air simultaneously through all of the conduits comprises the controller programmed to pump air simultaneously through a first one of the conduits at a first rate and through a second one of the conduits at a second rate different from the first rate.

4. A build material management system as claimed in claim 1, comprising:
   a trap downstream from the conduits to remove build material from air pumped through the conduits; and
   a storage container to store build material removed by the trap.

5. A build material management system for a 3D printing system to simultaneously cool multiple transportable containers each containing 3D printed parts packed in a volume of non-fused build material, the build material management system comprising:
   multiple transportable containers each having a housing for 3D printed parts packed in a volume of non-fused build material, an air input port through which air may flow into the housing, and an air outlet through which air may flow out of the housing;
   a pump; and
   multiple conduits in fluid communication with the pump through a valve, each conduit having an air inlet connected to an air outlet from a respective one of the transportable containers, and the valve movable between a first position in which all of the conduits are connected to the pump simultaneously to draw air through each of the transportable containers from the air input port to the air outlet without unpacking the printed parts from the volume of non-fused build material, a second position in which only a first one of the conduits is connected to the pump to draw air through a respective first one of the transportable containers from the air input port to the air outlet without unpacking the printed parts from the volume of non-fused build material, and a third position in which only a second one of the conduits different from the first one is connected to the pump to draw air through a respective second one of the transportable containers from the air input port to the air outlet without unpacking the printed parts from the volume of non-fused build material.

6. A build material management system as claimed in claim 5, wherein the pump and the valve are operable to pump air simultaneously through a first one of the conduits at a first rate and through a second one of the conduits at a second rate different from the first rate.

7. A build material management system as claimed in claim 5, comprising a trap downstream from the conduits to remove build material from air pumped through the conduits.

8. A build material management system as claimed in claim 7, comprising a storage container to store build material removed by the trap.

* * * * *